United States Patent
Legendre et al.

(10) Patent No.: US 7,595,445 B2
(45) Date of Patent: Sep. 29, 2009

(54) TRANSPOSITION DEVICE FOR A PREFABRICATED ELECTRICAL CANALIZATION

(75) Inventors: Philippe Legendre, Grenoble (FR); Jean Laurent Pozzobon, La Buisse (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 11/987,975

(22) Filed: Dec. 6, 2007

(65) Prior Publication Data
US 2008/0142239 A1 Jun. 19, 2008

(30) Foreign Application Priority Data
Dec. 15, 2006 (FR) .................................. 06 10918

(51) Int. Cl.
*H01B 11/02* (2006.01)
(52) U.S. Cl. .................... 174/33; 174/27; 174/70 B; 174/88 B; 174/99 B; 439/210; 333/1; 333/12
(58) Field of Classification Search ............ 174/27, 174/33, 32, 70 B, 72 B, 88 B, 99 B, 133 B, 174/135; 333/1, 12; 439/210, 213
See application file for complete search history.

(56) References Cited

U.S. PATENT DOCUMENTS

| | | | | |
|---|---|---|---|---|
| 2,301,266 A | * | 11/1942 | Fox | 29/869 |
| 2,553,747 A | * | 5/1951 | Carr | 174/33 |
| 2,786,152 A | | 3/1957 | Fisher | 307/147 |
| 2,912,603 A | | 11/1959 | Farnsworth | 307/147 |
| 3,148,312 A | | 9/1964 | Fouse | 317/120 |
| 3,213,183 A | | 10/1965 | Weimer et al. | 174/33 |
| 4,008,365 A | * | 2/1977 | Carlson | 174/68.2 |
| 4,262,163 A | | 4/1981 | Durrell et al. | 174/34 |
| 4,694,123 A | * | 9/1987 | Massey | 174/117 FF |
| 5,401,906 A | * | 3/1995 | Bryant | 174/88 B |
| 6,521,837 B2 | * | 2/2003 | Hilgert et al. | 174/99 B |
| 6,870,103 B1 | * | 3/2005 | Wiant et al. | 174/68.2 |
| 7,449,635 B2 | * | 11/2008 | Wiant | 174/68.2 |

FOREIGN PATENT DOCUMENTS

FR 1 143 060 9/1957

* cited by examiner

*Primary Examiner*—Dhiru R Patel
(74) *Attorney, Agent, or Firm*—Steptoe & Johnson LLP

(57) ABSTRACT

The present invention relates to a transposition device for a prefabricated electrical canalization, said canalization includes a certain number of conducting bars distributing different phases including or not the neutral, the bars extending substantially parallel to one another, the transposition device being designed to reverse the position of at least two bars with respect to one another in the canalization. This device is characterized in that it is designed to be incorporated in said canalization, and includes the same number of portions of bar as the number of above-mentioned bars of the canalization, at least one of these portions of bar being interrupted inside the device so as to form two parts of portions of bars, these parts includes at their ends a fold towards the outside of said device thus forming an end part that is outwardly offset so as to increase the space between these end parts.

9 Claims, 7 Drawing Sheets

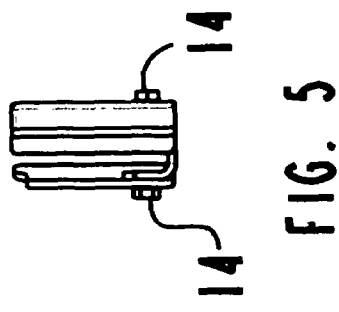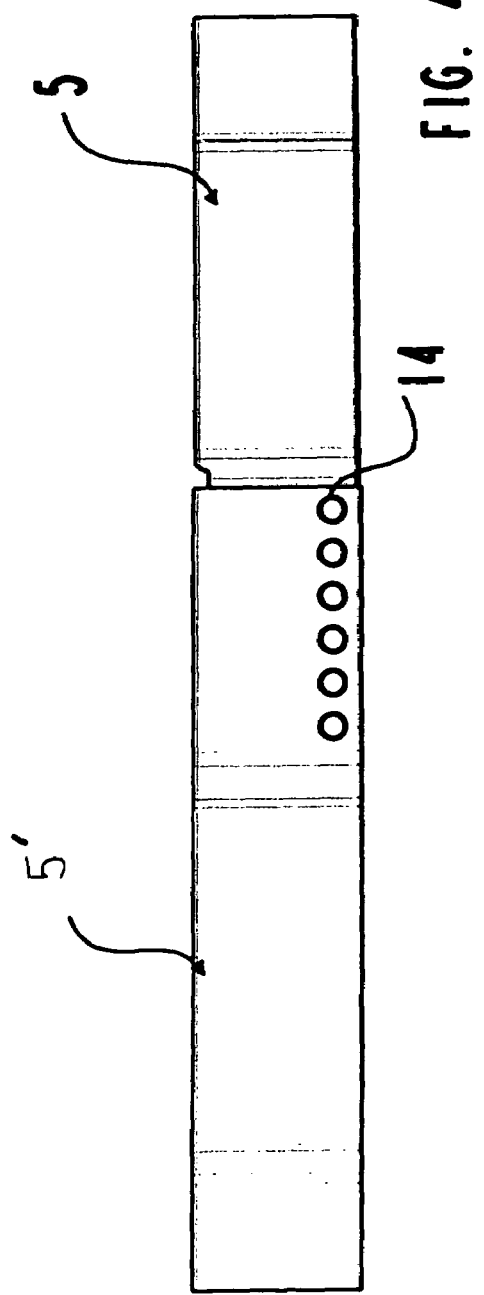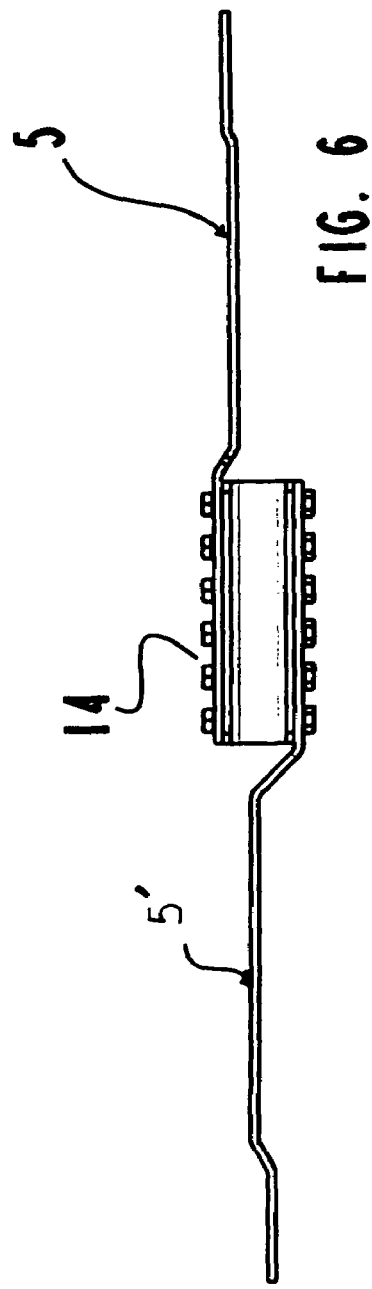

TRANSPOSITION DEVICE FOR A PREFABRICATED ELECTRICAL CANALIZATION

BACKGROUND OF THE INVENTION

The present invention relates to a transposition device for a prefabricated electrical canalization, said canalization comprising a certain number of conducting bars distributing different phases which may include a neutral, said bars extending substantially parallel to one another, said transposition device being designed to reverse the position of at least two bars with respect to one another in the canalization.

In the present state of the art, transposition of the phases or neutral is performed on power supplies situated at the end of the line which takes up a large amount of space. Each canalization must be custom-transposed, resulting in longer lead times and higher costs.

SUMMARY OF THE INVENTION

The present invention solves these problems and proposes a prefabricated electrical canalization presenting small dimensions, that is easy to incorporate in a line at any level, and that presents a good short-circuit strength.

For this purpose, the object of the present invention is to provide a transposition device for a prefabricated electrical canalization. The canalization comprises a certain number of conducting bars distributing different phases which may include a neutral, and the bars extend substantially parallel to one another. The transposition device is designed to reverse the position of at least two bars with respect to one another in the canalization. The device is designed to be incorporated in said canalization, and it receives as inputs from the canalization the same number of bars as it outputs to the canalization. At least one of the bars is split inside the device to form two end portions or sections (9, 9') corresponding to an input portion (5) of the bar and an output portion (5') of the bar, respectively. Each of the input and output portions of the bar comprise folds (7, 7', 8, 8'), or bends. Folds (8, 8') direct the input and output sections of the bar toward opposite outer edges of the device, and folds (7, 7') direct the input and output sections of the device back toward a center of the device, so that end sections (9, 9') which are adjacent to folds (7, 7'), are parallel to each other.

The end portions (9, 9') of the bar are thus offset outwardly so as to increase the space between the end parts (9, 9') of portions (5, 5') of the bar. This offset space enables the end portions (9, 9') to electrically connect with one another by means of a conducting bridge (16) fixed onto said end parts (9, 9'). The conducting bridge (16) electrically connects end portions (9, 9') via the outside edge of the bars (1,2,3,4) on one side or the other of the device in such a way that the two above-mentioned parts (5, 5') are located on different planes at the input and output of the transposition device, and may be transposed with respect to any other canalization bar.

Each bar to be transposed may have a predetermined relationship with the neutral bar. For example, in FIG. 9, the respective distances between input ends and first input sections of bars to be transposed (2) and (4) are identical. An input end (9) of a bar to be transposed is offset from the first input section 10 by a certain distance d. This distance d is about one half of a distance e separating a first input section of the neutral bar (11) from the offset or outermost portion (12) of the neutral bar. In other words, the distance between the first section of the input portion (10) (before fold 7) and the input end (9) is about half the distance between input end section (11) and offset portion (12).

According to a particular feature, this device may comprise a bar distributing the neutral n and three portions of bars distributing a phase. The bar distributing the neutral n is transposed, and the bars conveying the first, second, and third phases each have bends, such that each bar has two parts extending in parallel planes separated from one another by a certain distance g. This distance g is about a half of a distance f separating the two parallel input parts of the neutral conductor.

According to a particular feature of the invention, transposition is performed in such a way that the whole of the transposition presents an overall dimension corresponding substantially to that of a straight canalization element without transposition.

According to a particular feature of the invention, the two above-mentioned parts of portions of bar each comprise two successive folds and an end part extending parallel to the plane of said part of portion of bar before folding and being offset towards the outside of the device with respect to this part of portion of bar before folding.

According to a particular feature, the above-mentioned conducting bridge presents a U-shaped cross-section, said bridge presenting a base and two wings, said wings being respectively fixed to the two end sections of the bar to be transposed.

According to another feature, the wings of the conducting bridge are fixed onto said end parts of the portions of bar by means of bolts, nuts and holes provided in said end parts of the portions of bar and in the above-mentioned wings of the conducting bridge.

According to another embodiment, this device comprises a portion of bar distributing the neutral and three portions of bar distributing a phase, respectively a phase 1, a phase 2 and a phase 3, and comprising two transpositions respectively made on phase 1 and phase 3.

According to a particular feature, the transposition made on phase 1 is achieved by a first conducting bridge passing via one of the sides of the device whereas the transposition on phase 3 is achieved by a second conducting bridge passing via the opposite side of said device.

According to a particular feature, the portion of bar distributing the neutral comprises an outward fold over a length corresponding substantially to the length of the conducting bridges so as to create a space for the conducting bridges between the portion of neutral bar and the other portions of bar, the offset between the parts of portions of bar before and after folding in the case of the conductor part distributing the neutral being substantially twice that of the that associated with the parts of portions of bar distributing the phases.

According to another feature, the portions of bar are plated and covered with an insulating material and on the parts of conductor situated inside the conducting bridge the above-mentioned insulating material has been removed over the length of said bridge.

BRIEF DESCRIPTION OF THE DRAWINGS

Other features and advantages of the invention will become more clearly apparent from the following detailed description which refers to the enclosed drawings given for example purposes only and in which:

FIG. 4 is a side view of two parts of portions of bar on which a transposition has been made, and which are electrically connected via the bottom of the device, FIG. 5 is a left-hand side view of the previous figure, FIG. 6 is a top view of FIG. 4.

DETAILED DESCRIPTION OF AN EMBODIMENT

Figure 1:
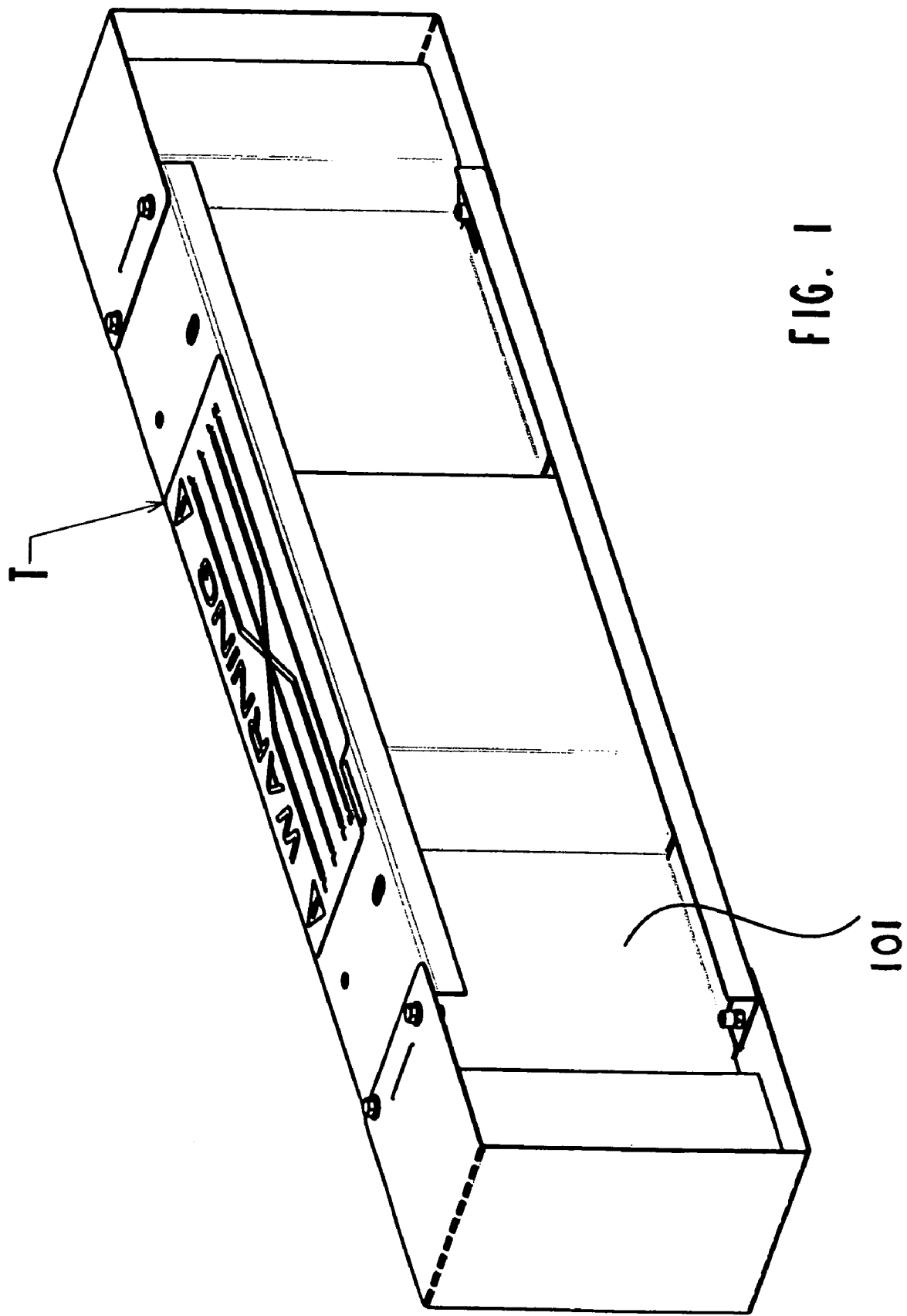
FIG. 1 is a perspective view of the transposition device according to the invention.

A transposition device T for a prefabricated electrical canalization according to the invention is represented in FIG. 1. The canalization comprises a certain number of conducting bars housed in an insulating case. These bars extend parallel to one another and present different cross-sections according to the rating associated with the bar. These bars distribute different phases and a neutral in the order in which they are arranged in the canalization.

The transposition device T according to the invention is designed to be incorporated in the canalization and comprises a certain number of bars 1, 2, 3, 4. The number of bars entering and exiting the device correspond to the number of bars of the canalization. Although four bars are disclosed in the following embodiments, any number of bars may be used. The bars 1, 2, 3 and 4 extend parallel with respect to one another and are designed to conduct the different phases (e.g., first, second, and third) and the neutral n in the same order as that of the bars of the canalization.

Thus, in the figures, bars 1, 2, 3 and 4 may respectively distribute the neutral, first, second, and third phases.

Figure 9:
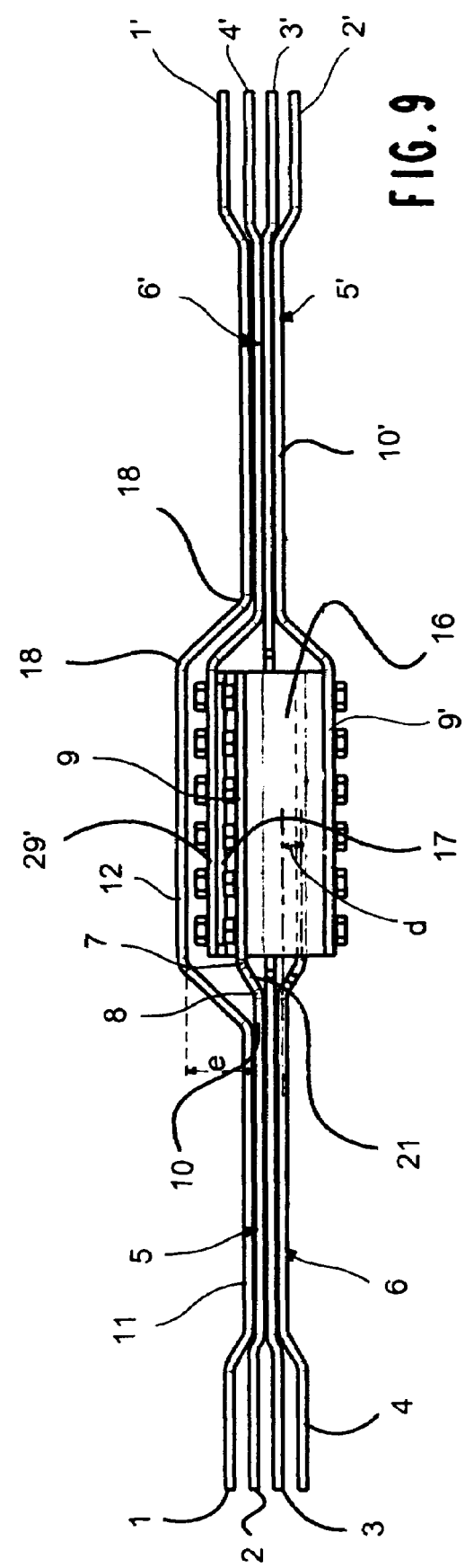
FIG. 9 is a top view of FIG. 8.

The object of the transposition device T according to the invention is to reverse the position of one bar with respect to another in the canalization. For example, as shown in FIG. 9, incoming portions of bars 1, 2, 3, and 4 may correspond to neutral, first phase, second phase, and third phase, respectively. However, while bars 1 and 3 remain unchanged after passing through the device, bars 2 and 4 are split inside the device. Section 5 of bar 2 ends in input end section 9, which is connected to one end of bridge 16. Output end section 9' of section 5' of bar 2' is connected to the other end of the bridge 16. Thus, output bars 2' and 4' switch places with respect to each other and with respect to bars 1' and 3' at the output of the device. In other words, if incoming bars 1, 2, 3 and 4 conduct neutral, and first-third phases, respectively, then output bars 1', 4', 3' and 2' conduct neutral, third phase, second phase, and first phase respectively.

As stated previously, the bars to be transposed within the transposition device T are interrupted inside the device 101 to form two end sections 9, 9' of bar portions 5, 5'. Each portion 5, 5' has a first fold or a second bend, a third bend, 7, 7' and a second fold or a first bend, a fourth bend, 8, 8', which separate a part after folding 9, 9', or end section, from a part before folding 10, 10'.

Figure 2:
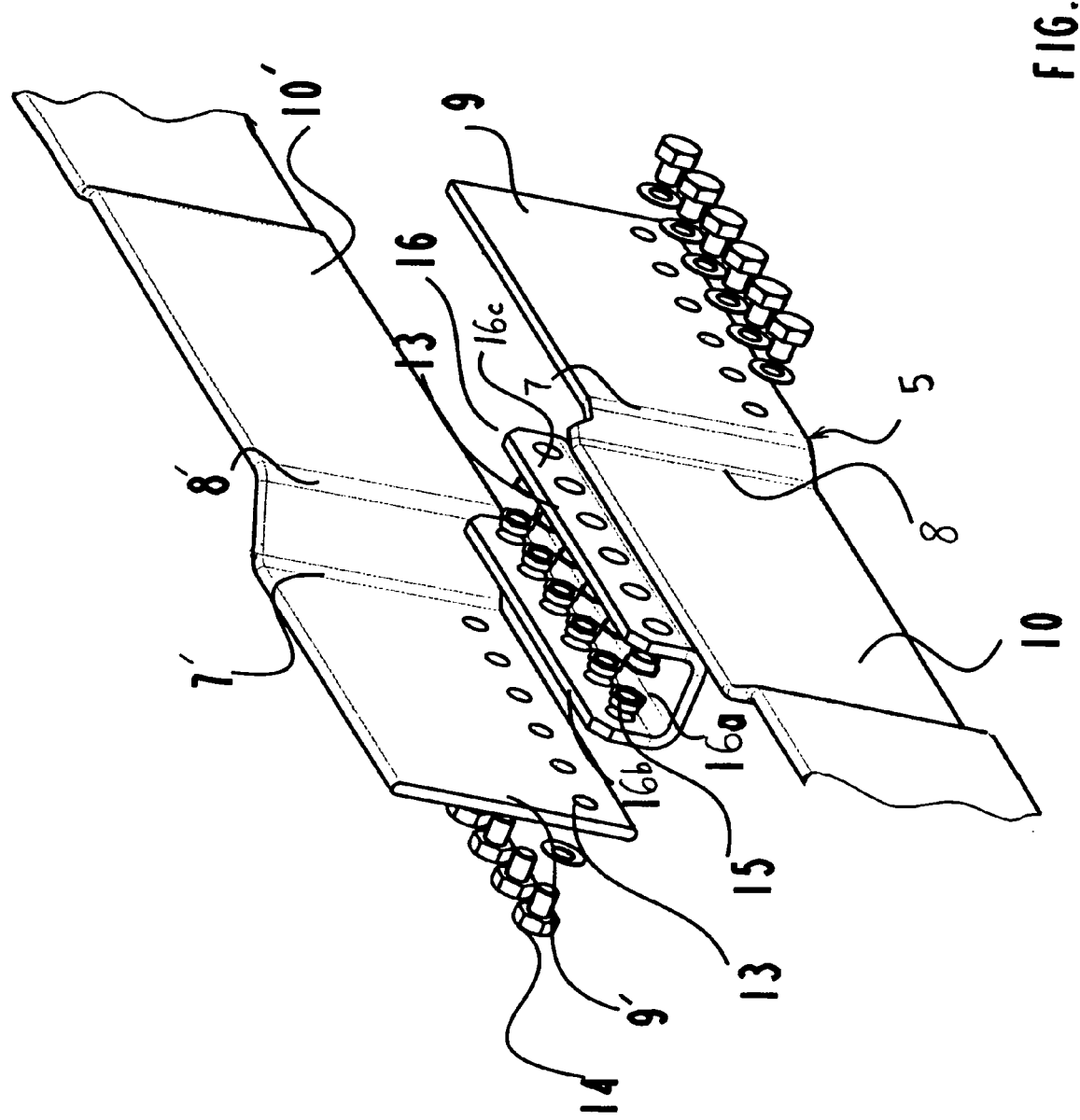
FIG. 2 is a partial perspective view illustrating electrical connection of two parts of portions of bar on which the transposition is made, before electrical connection of said portions.
Figure 3:
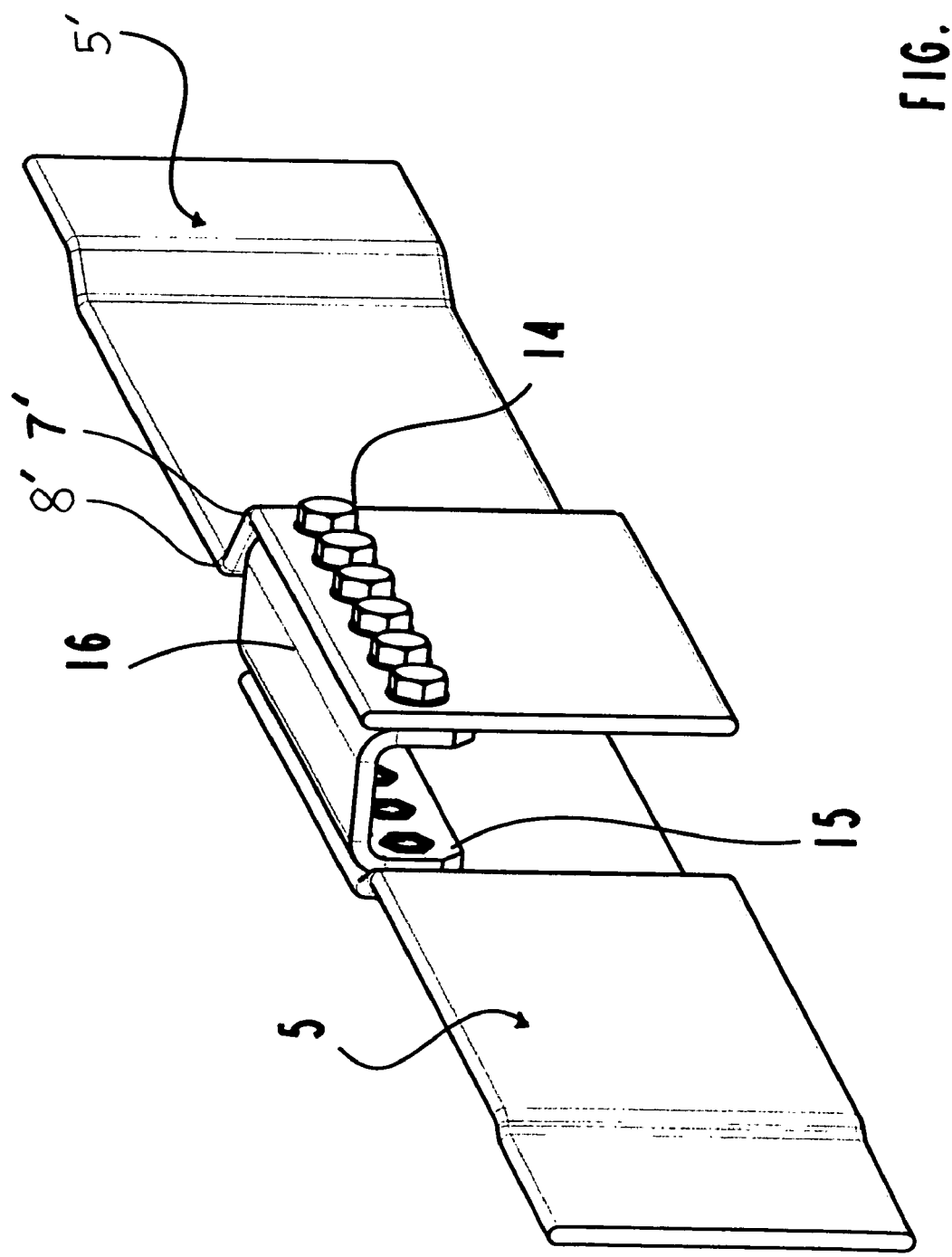
FIG. 3 is a partial perspective view illustrating this same connection in the connected position of the parts of portions of bar.

End sections 9, 9' extend parallel to the portion of canalization before folding 10, 10', but are offset towards the outside of the device T with respect to part before folding 10 (see, e.g., FIG. 2). This offset enables a conducting bridge 16 having a U-shaped cross-section to be located between end sections 9, 9'. The length of the end sections 9, 9' correspond substantially to the length of the conducting bridge 16. This conducting bridge 16 comprises a base 16a and two wings 16b, 16c, these two wings 16b, 16c are designed to be fixed to the internal face of said end parts 9, 9'. For this purpose, wings 16b, 16c and end parts 9, 9' comprise holes 13 designed to operate in conjunction with bolts 14 and nuts 15 to attach the end parts 9, 9' to the conducting bridge 16.

Figure 7:
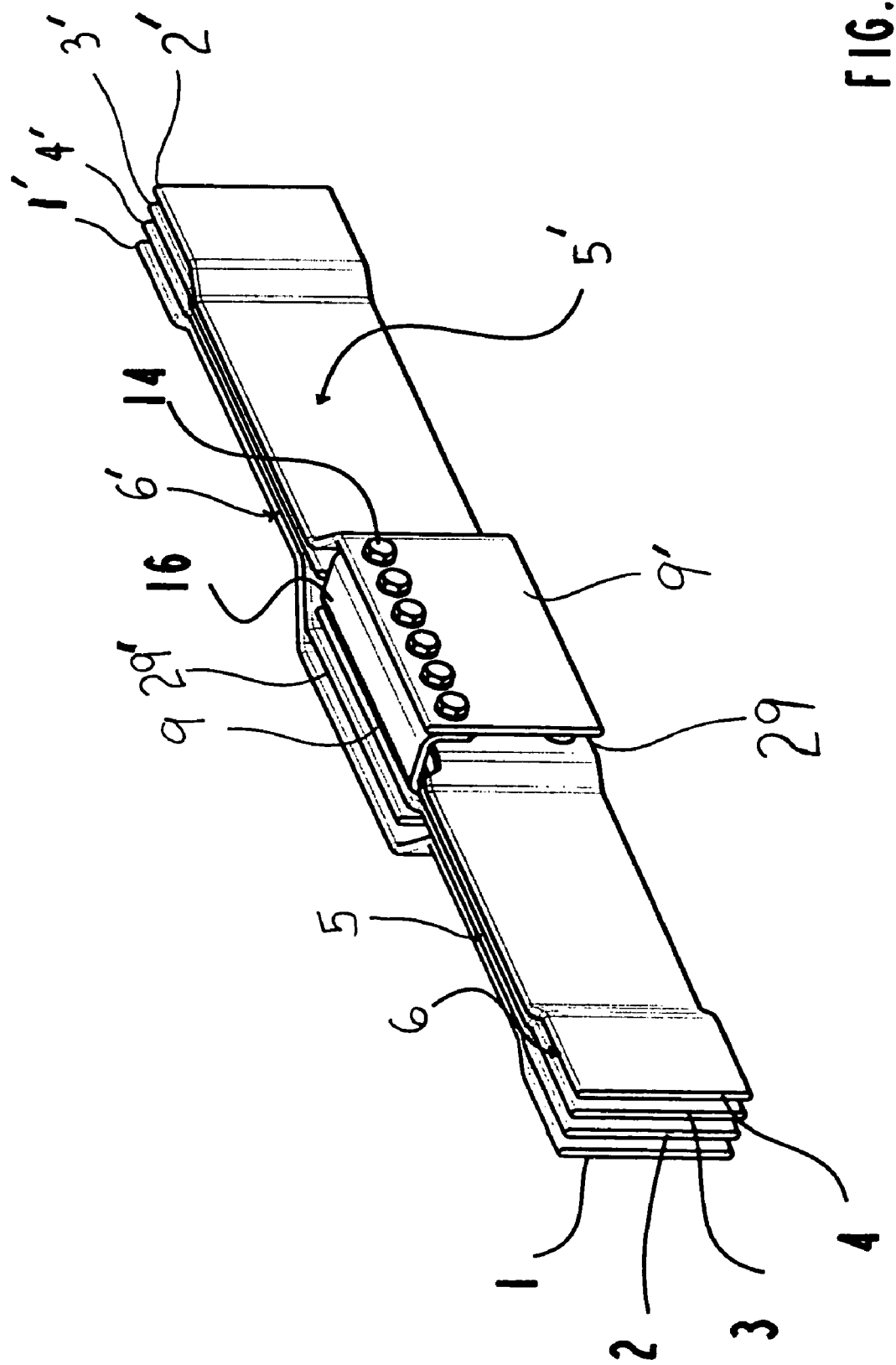
FIG. 7 is a perspective view of a transposition device according to a particular embodiment of the invention in which two phase transpositions are made.
Figure 8:
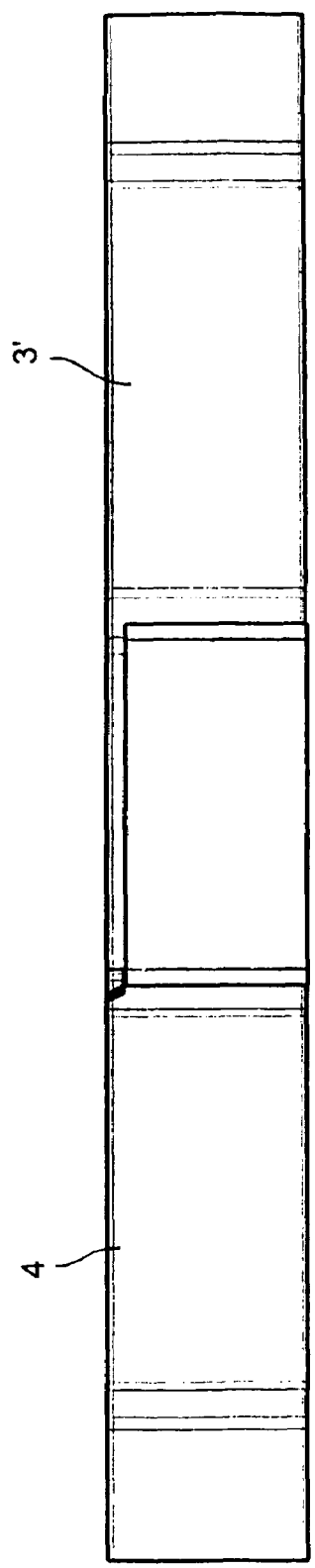
FIG. 8 is a front view of FIG. 7, without output portion 5', connector bridge 16, or connecting bolts or holes.

According to the embodiment illustrated in FIGS. 7, 8 and 9, bars 2 and 4, which may distribute the first and third phases, for example, are transposed. Thus, the end sections 9, 9' corresponding to bar 2 (2') and end sections 29, 29' corresponding to bar 4 (4') are interrupted and folded in the manner which has just been described. A first bridge 16 for transposing bar 2 is located at the top part of the device and connects the input and output portions 5, 5' of bar 2 (2'), so that the orientation of parts 5, 5' are reversed with respect to each other. In other words, portion 5 of bar 2 is physically closer to a plane defining a first side of the device that is parallel to an input section of portion 5 than section 5'.

A second bridge 17 for transposing bar 4 may be located at the bottom part of the device. Bridge 17 may connect end sections 29, 29' of input and output portions 6, 6' of bar 4 (4'). Thus, bar 2, which may correspond to a first phase may switch positions with bar 4, which may correspond to a third phase. It should be noted that in this embodiment the neutral bar 1, which does not comprise a transposition, is folded outwards along four folding lines 18 so as to create a space between said neutral bar 1 and the other bars to house the above-mentioned conducting bridges 16,17.

One of bars 2, 3, and 4, which may be designed to convey the first, second, and third phases, may also comprise a middle portion (or second input section) 21 between the first input section and the input end, so that each bar has two parts extending in parallel planes but at a certain distance d from one another. This distance d is about one half of a distance e separating an input section 11 of neutral conductor 1 from a center, outer-most portion 12, the input section 11 and the center portion 12 running parallel to each other.

Figure 10:
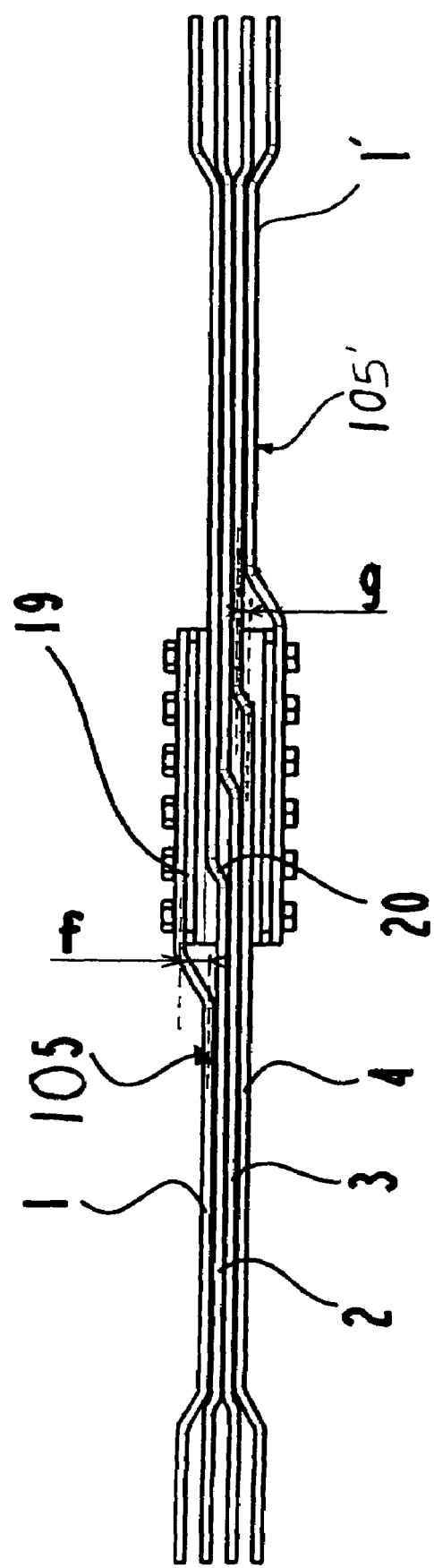
FIG. 10 is a top view of a transposition device according to another embodiment of the invention in which only transposition of the neutral is performed.

According to the embodiment described in FIG. 10, bar 1 (1') distributing the neutral n is transposed. The neutral bar 1 is thus interrupted inside the device T and the two parts 105, 105' of the neutral bar are folded in the previously described manner. A conducting bridge 19 is arranged at the bottom part of the device and electrically connects the parts 105, 105' of the neutral bar, thereby reversing an orientation of the neutral bar with respect to the other bars in the canalization. Specifically, while neutral bar 1 was located closest to a first side of the canalization upon entering the device, the neutral bar 1' was located on the opposite side upon exiting the device.

The order at the input of the device is therefore neutral, phase 1, phase 2, phase 3, whereas the order at the output is phase 1, phase 2, phase 3 and neutral.

In this embodiment, bars 2, 3 and 4 distributing the phases each comprise a fold. The offset f between the first input section (before folding) of the neutral bar and the input end (after folding) of the neutral conductor is twice the distance g between an input portion (before folding) of each of the bars distributing phases and an output portion (after folding).

A transposition device for a canalization has thus been achieved according to the invention that is of simple design and presents reduced overall dimensions corresponding to that of a line element.

This device is easy to incorporate in a line at any level and comes in the form of a standard element presenting a homogeneous short-circuit strength.

The device according to the invention enables the production and ergonomic conditions of assembly stations to be improved. It also enables business design offices to make savings in the time required to install canalizations.

Naturally the invention is not limited to the embodiments described and illustrated which have been given for example purposes only.

On the contrary the invention extends to encompass all the technical equivalents of the means described as well as combinations thereof if the latter are achieved according to the spirit of the invention.

The invention claimed is:

1. A transposition device for changing a position of at least one bar of a canalization with respect to another bar of the canalization, such bars running parallel to each other in the canalization, the transposition device comprising:
   a plurality of bars of a canalization, the plurality of bars running parallel to each other in the canalization, each of said bars having an input portion at an input of the transposition device and an output portion at an output of the transposition device;
   a first bar of the plurality of bars having an input end terminating the input portion and an output end terminating the output portion;
   a conducting bridge mechanically connecting the input portion of the first bar with the output portion of the first bar, the input and output portions being physically separated from one another within the transposition device, the conducting bridge traversing a second bar, thereby changing a position of the first bar with respect to said second bar, wherein the input portion of the first bar comprises a first bend toward an outer edge of the transposition device and a second bend back toward a center of the transposition device, such that a first portion of the first bar adjacent to the first bend and extending to an input of the transposition device from the canalization and the first bend defines a first input section, a second portion of the first bar between the first bend and the second bend defines a second input section, and a third portion of the first bar between the second bend and the input end of the first bar defines an input end section, and the output portion of the first bar comprises a third bend toward an outer edge of the transposition device and a fourth bend back toward a center of the transposition device, such that a fourth portion of the first bar adjacent the third bend and extending to an output of the transposition device defines a first output section, a fifth portion of the first bar between the third bend and the fourth bend defines a second output section, and a six portion of the first bar between the fourth bend and the output end defines an output end section, wherein the first input section, input end section, first output section, and output end section are parallel to one another.

2. The transposition device according to claim 1, wherein the plurality of bars successively comprises a bar for conducting the neutral and three bars for conducting three phases, wherein the bar for conducting the neutral is the first bar; the conducting bridge is connected to said input portion and said output portion of the bar for conducting the neutral; each of the three bars for conducting three phases comprises an input section, an output section, and a bend section, the input and output sections being parallel to each other; and a first distance between imaginary planes running along centers of the input section and the output section of each one of the bars for conducting three phases is about half a distance between imaginary planes running along the centers of the first input section and input end of the bar for conducting the neutral.

3. The transposition device according to claim 1, wherein the canalization has predetermined height and width dimensions, and
   the height and width of the transposition device correspond substantially to those of a straight canalization element without transposition.

4. The transposition device according to claim 1, wherein the conducting bridge has a U-shaped cross-section, said conducting bridge having a base and two wings, said wings for being fixed to the input portion and the output portion, respectively, of the first bar.

5. The transposition device according to claim 4, wherein the wings of the conducting bridge are fixed onto said input and output portions by bolts.

6. The transposition device according to claim 1, wherein the plurality of bars comprises four bars for carrying a neutral, first phase, second phase, and third phase, respectively, such that at said input of the transposition device, the bar for carrying the neutral is at a first end of the canalization, the bar for carrying the first phase is adjacent to the bar for carrying the neutral, the bar for carrying the second phase is adjacent to the bar for carrying the first phase, and the bar for carrying the third phase is adjacent to the bar for carrying the second phase, at an opposite end of the canalization as the bar for carrying the neutral, and the first bar is one of the bar for carrying the first phase or the bar for carrying the third phase, such that at said output of the transposition device, the positions of only the bars for carrying the first and third phases are switched relative to their positions at the input of the device.

7. The transposition device according to claim 6, wherein the conducting bridge mechanically connecting the input portion of the first bar with the output portion of the first bar is a first conducting bridge for transposing the bar for carrying the first phase, the transposition device further comprises a second conducting bridge for transposing the bar for carrying the third phase, each of the first and second conducting bridges has a U-shaped cross-section, said conducting bridges having a base and two wings, said wings for being fixed to the input portion and the output portion, respectively, of the bar for carrying the first phase and the bar for carrying the third phase, the base of said first conducting bridge is located on a first side of the transposition device, and a base of said second conducting bridge is located on a second side of the transposition device opposite the first side.

8. The transposition device according to claim 7, wherein the input portion of the bar for conducting a neutral comprises a first input section and an offset section parallel to the first input section and running along a different plane than the first input section, the offset having a length corresponding substantially to a length of the conducting bridges, to create a space for the conducting bridges between the offset portion of the neutral bar and a first imaginary plane along which the input section runs, and a distance between said first imaginary plane running along a center of the first input section of the bar for conducting a neutral and a second imaginary plane running along a center of the offset portion of the bar for conducting a neutral is substantially twice as long as a distance between said first imaginary plane running along a center of the first input section of the first bar and a third imaginary plane running along a center of the input end of the first bar.

9. The transposition device according to claim 1, wherein the first bar is plated and covered with an insulating material and the insulating material is not located on portions of the first bar adjacent to the conducting bridge or over the length of said conducting bridge.

* * * * *